(12) United States Patent
Trutna, Jr.

(10) Patent No.: US 7,215,837 B2
(45) Date of Patent: May 8, 2007

(54) OPTICAL WAVEGUIDE DISPLAY SYSTEMS AND METHODS

(75) Inventor: William R. Trutna, Jr., Atherton, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/126,805

(22) Filed: May 10, 2005

(65) Prior Publication Data

US 2006/0257064 A1    Nov. 16, 2006

(51) Int. Cl.
*G02F 1/335* (2006.01)
(52) U.S. Cl. .............................. 385/7; 385/31; 385/901
(58) Field of Classification Search .................... 385/7, 385/901
See application file for complete search history.

(56) References Cited

U.S. PATENT DOCUMENTS

| 5,009,483 | A | 4/1991 | Rockwell, III |
| 5,106,181 | A | 4/1992 | Rockwell, III |
| 6,859,569 | B2* | 2/2005 | Ishibashi et al. .............. 385/12 |
| 2002/0046020 | A1 | 4/2002 | Ishibashi et al. |

* cited by examiner

*Primary Examiner*—Sarah Song

(57) ABSTRACT

Optical waveguide systems and methods are described. In one aspect, a display system includes a planar acoustic cavity having a fundamental resonant acoustic mode. The acoustic cavity includes an array of optical waveguides and an array of acoustic transducers. Each of the optical waveguides includes a respective cladding surrounding a liquid-filled core. The array of acoustic transducers is operable to generate acoustic waves that propagate in the acoustic cavity across the cores of the optical waveguides.

25 Claims, 5 Drawing Sheets

OPTICAL WAVEGUIDE DISPLAY SYSTEMS AND METHODS

BACKGROUND

Until relatively recently, the vast majority of displays were built around cathode ray tube (CRT) technology, in which beams of electrons excite phosphors at the screen end of a glass tube. In a CRT display, the length of the glass tube increases with the width of the screen. As a result CRT displays tend to be large and bulky. In an effort to produce large display screens without the bulkiness of CRT displays, a wide variety of different flat panel display technologies have been developed. Among the most promising of these technologies have been liquid crystal, gas plasma, vacuum fluorescent, electroluminescent, and optical waveguide technologies. Indeed, liquid crystal and gas plasma displays are rapidly overtaking CRT displays for television and computer display applications.

Optical waveguide based display systems offer a promising alternative to liquid crystal and gas plasma display systems. For example, optical waveguide displays can be fabricated using lighter and less expensive materials and components than liquid crystal and gas plasma displays.

Some optical waveguide display systems are formed from an array of optical waveguides that include a series of taps along their lengths. The taps are configured to remove light from the waveguides at the pixel locations of the display. The taps may be scanned sequentially to emit visible images from the display. Light tapping techniques based on electro-optic, thermo-optic, and liquid crystal effects have been proposed.

Recently, a display apparatus has been proposed that includes an array of optical fibers with liquid-filled cores and an array of elongate piezoelectric elements. The piezoelectric elements are wrapped around respective pixel regions of the optical fibers. The piezoelectric elements generate acoustic waves that are focused onto the centers of the optical fibers at the pixel regions to induce cavitation in the liquid filled cores. The bubbles that are produced by the cavitation scatter light out of the liquid-filled cores to produce visible light at the pixel locations. In this approach, the acoustic waves only propagate in the optical fibers. In general, acoustic waves cannot be focused onto regions that are larger than the acoustic wavelength. Therefore, in order to achieve any type of acoustic wave focusing in this display approach, the acoustic wavelength should be no greater than the optical fiber diameter. The optical fibers in this display approach are 200–300 μm (micrometers) in diameter, in which case the lowest acoustic frequency is on the order of 5 MHz, assuming the optical fibers are filled with water. The acoustic power needed for cavitation (and the associated operating temperature) increases exponentially with acoustic frequency. Therefore, it is desirable to reduce the operating acoustic frequencies in such optical waveguide display systems.

SUMMARY

In one aspect, the invention features a display system that includes a planar acoustic cavity having a fundamental resonant acoustic mode. The acoustic cavity includes an array of optical waveguides and an array of acoustic transducers. Each of the optical waveguides includes a respective cladding surrounding a liquid-filled core. The array of acoustic transducers is operable to generate acoustic waves that propagate in the acoustic cavity across the cores of the optical waveguides.

In another aspect, the invention features a display method in accordance with which light is optically guided through an array of liquid-filled channels. Acoustic waves are generated. The acoustic waves propagate across the liquid-filled channels in substantially uniform propagation directions and induce localized cavitation in the liquid.

In another aspect, the invention features a method of fabricating a display system. In accordance with this inventive method, an array of optical waveguides is formed. Each of the optical waveguides includes a respective cladding surrounding a liquid-filled core. An array of acoustic transducers is formed. The acoustic transducers are operable to generate acoustic waves that propagate in an acoustic cavity across the cores of the optical waveguides. The array of optical waveguides and the array of acoustic transducers are combined to form the acoustic cavity having a fundamental resonant acoustic mode.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

In the display embodiments that are described in detail below, light is optically guided through an array of liquid-filled channels in which cavitation is induced by acoustic waves that propagate in a planar acoustic cavity across the liquid-filled channels. In these embodiments, the process of forming the acoustic waves is decoupled from the physical dimensions of the liquid-filled channels. In this way, these embodiments can induce cavitation in the array of liquid-filled channels at lower frequencies that are compatible with practical power and heating design constraints.

Figure 1:
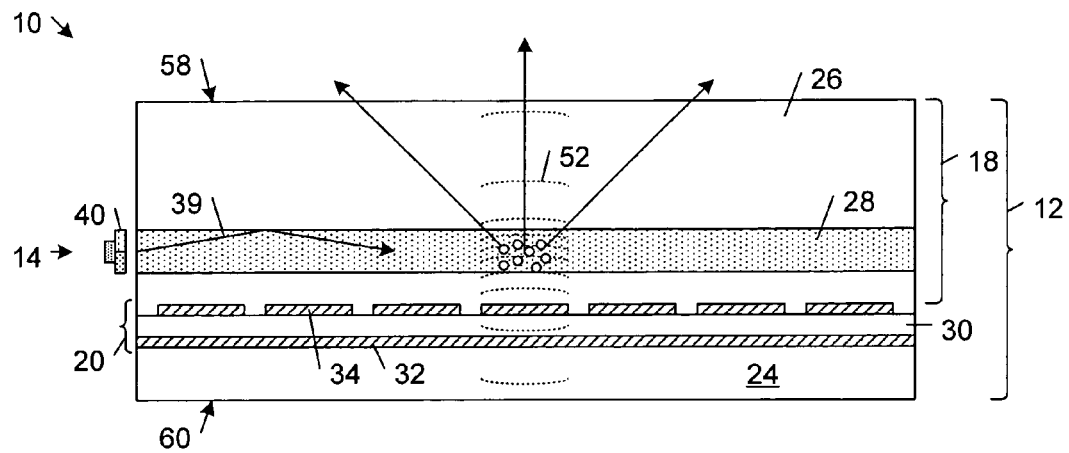
FIG. 1 is a diagrammatic sectional view of an embodiment of an optical waveguide display system that includes a planar acoustic cavity.
Figure 2:
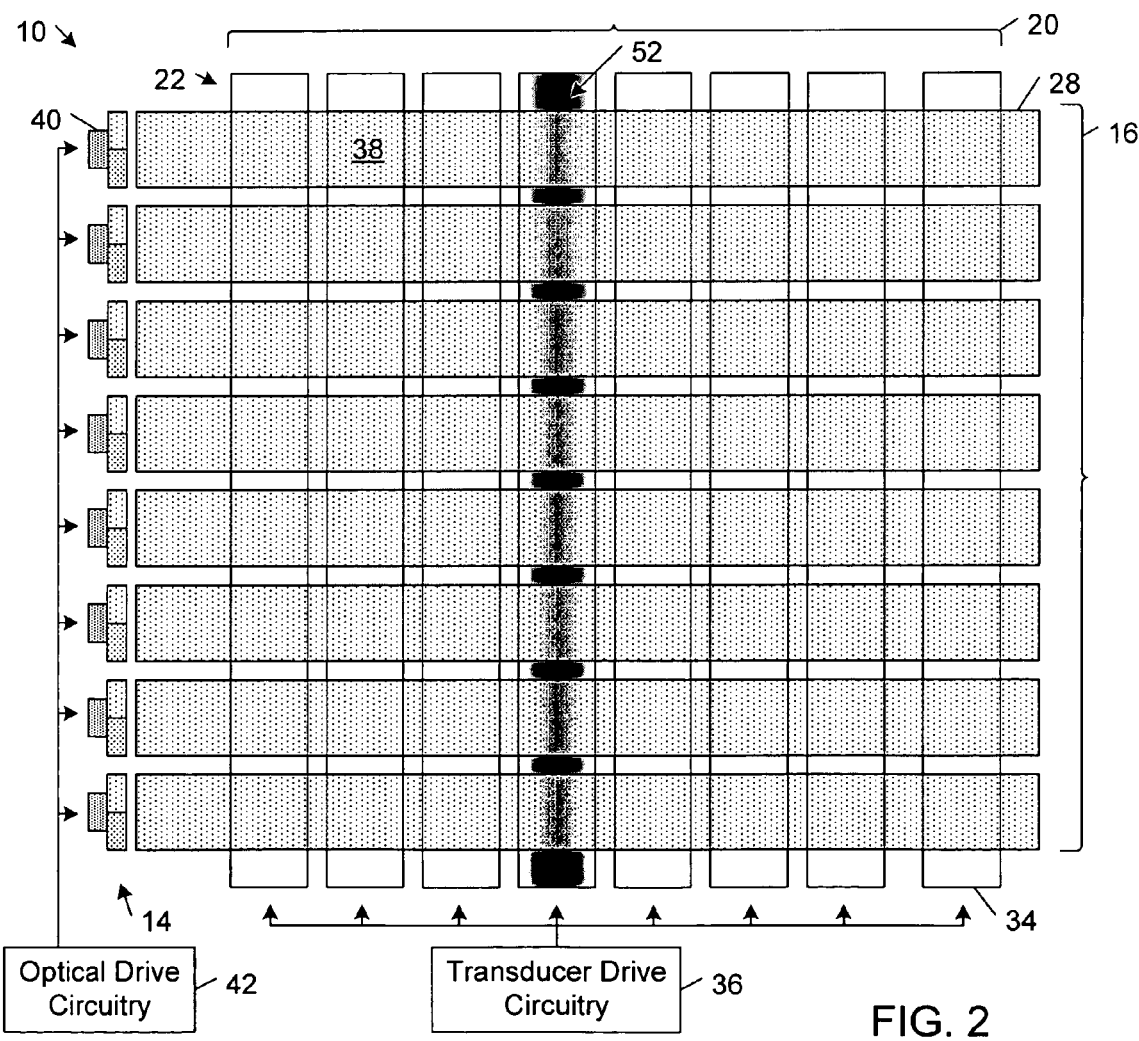
FIG. 2 is a diagrammatic top view of the optical waveguide display system shown in FIG. 1.

FIGS. 1 and 2 show an embodiment of an optical waveguide display system 10 that includes a planar acoustic cavity 12 and a light source system 14. The planar acoustic cavity 12 includes an array 16 of optical waveguides 18, an array 20 of acoustic transducers 22, and a substrate 24. As used herein, the term "planar" refers to the surfaces that define the acoustic cavity 12. These surfaces are typically flat as shown in the illustrated embodiments. In other embodiments, the surfaces are slightly curved, as is typical with some types of display, but are parallel to one another. It is intended that the term "planar" encompass such curved embodiments.

The array 16 of optical waveguides 18 may be formed of any optical structure that includes for each optical waveguide 18 a respective cladding 26 surrounding a respective core 28 that defines a respective channel, which is filled with a liquid. The cladding 26 has a lower refractive index than the liquid filling the cores 28 so that light remains in the liquid-filled cores 28 except at locations of cavitation-induced refractive index perturbations. Exemplary materials for the cladding 26 include plastic and glass. Exemplary liquids for the core 28 include water, benzyl alcohol, and carbon disulfide. In one implementation, the cladding 26 is formed of a polytetrafluoroethylene (TEFLON®) and the core 28 is filled with water.

The array 20 of acoustic transducers 22 may be formed of any type of structure capable of generating acoustic waves. In the illustrated embodiment, the array 20 of acoustic transducers 22 is formed of a planar sheet 30 of piezoelectric material that includes a ground plane electrode 32 on one surface and an array of signal electrodes 34 on an opposite surface. The signal electrodes 34 define the locations of the individual acoustic transducers 22 in the array 20. Exemplary types of piezoelectric material that may be used to form the sheet 30 include: lead-zirconate-titanate (PZT); a wurtzite-type hexagonal crystal, such as cadmium sulfide, cadmium selenide, zinc oxide, beryllium oxide, aluminum nitride, and wurtzite zinc sulfide, and solid solutions thereof; a non-wurtzite-type hexagonal crystal piezoelectric material, such as a sphalerite cubic crystal; and polymers such as polyvinylidene (PVDF). The electrodes 32 and 34 may be formed of any electrically conducting material. In some implementations, the electrodes 32, 34 are formed of a metal that is silk-screened or photolithographically patterned onto the surfaces of the planar sheet 30 of piezoelectric material. The transducers 22 are driven by transducer driver circuitry 36, which typically includes an oscillator (e.g., a crystal oscillator) that is connected to the signal electrodes 34 of the acoustic transducers 22.

The substrate 24 may be formed of any type of material that provides structural support for the other components of the planar acoustic cavity 12. In some implementations, the substrate 24 is formed of a metal (e.g., aluminum), which serves as a sink for heat that is generated by the array 20 of acoustic transducers 22. In other embodiments, the substrate 24 may be omitted, in which case, the exposed surface of the ground plane electrode 32 forms one boundary of the planar acoustic cavity 12.

As shown in FIG. 2, the optical waveguides 18 are aligned along the rows of the display system 10 and the acoustic transducers 22 are aligned along the columns of the display system 10. Individual pixels 38 of the display system 10 correspond to the regions of overlap between the optical waveguides 18 and the acoustic transducers 22. FIG. 2 shows an 8×8 pixel region of the display system 10.

The light source system 14 is configured to inject multi-colored light 39 into each of the optical waveguides 18. Light may be injected into the optical waveguides 18 using any one of a wide variety of methods. In the illustrated embodiment, the light source system 14 includes a multi-emitter light source 40 for each of the optical waveguides 18. In one implementation, each of the multi-emitter light sources 40 includes three light emitting devices (e.g., light emitting diodes) that are configured to inject light of a different respective color (e.g., red, green, and blue) into a respective one of the optical waveguides 18. The light sources 40 are driven by optical drive circuitry 42, which controls the generation of the different colored light from the constituent light emitting devices to create the respective brightness and color for each pixel 38 in the display system 10.

Figure 3:
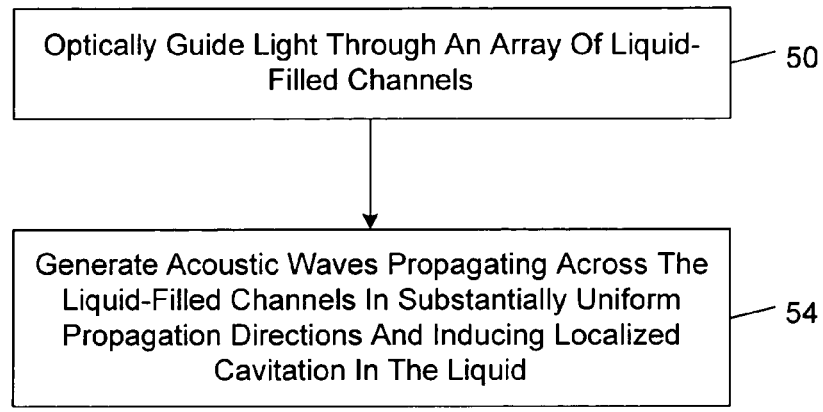
FIG. 3 is a flow diagram of an embodiment of a display method.

FIG. 3 shows an embodiment of an operating method of the optical waveguide display system 10. In accordance with this method, the optical waveguides 18 optically guide light through the array of liquid-filled channels defined by the cores 28 (block 50). As explained above, the refractive index of the cladding 26 is lower than the refractive index of the liquid-filled cores 28 and, therefore, the light that is injected into the optical waveguide cores 28 by the light source system 14 is guided by total internal reflection in accordance with Snell's Law. The optical drive circuitry 42 drives the light emitting devices of the light sources 40 so that the light that is injected into the cores 28 of the optical waveguides 18 has the respective brightness and color for the pixels 38.

A currently active one of the acoustic transducers 22 generates acoustic waves 52 that propagate across the liquid-filled channels that are defined by the cores 28 in substantially uniform propagation directions. The acoustic waves induce localized cavitation in the liquid (block 54).

Figure 4:
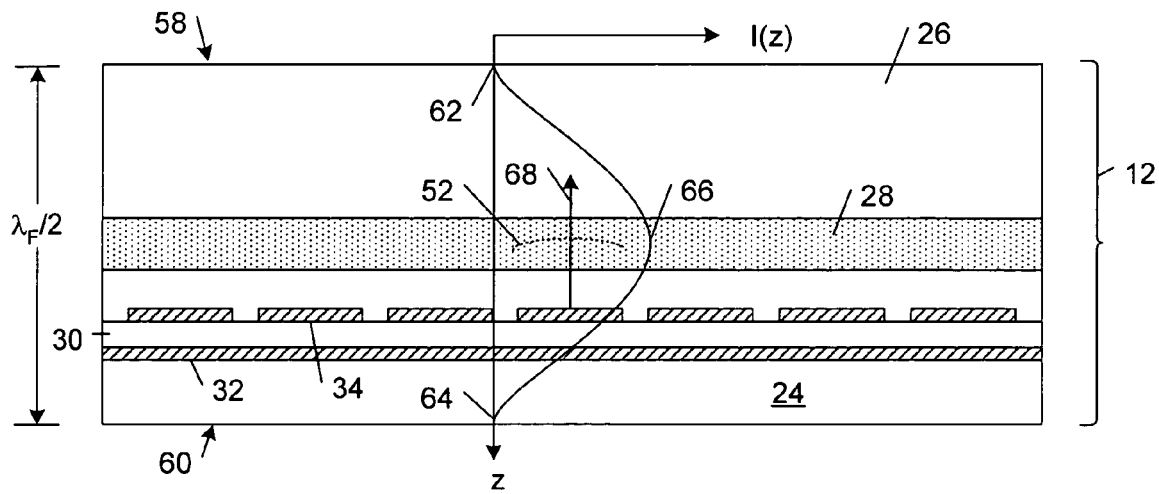
FIG. 4 is a diagrammatic sectional view of a graph of acoustic wave intensity as a function of position superimposed over the planar acoustic cavity of the optical waveguide system shown in FIG. 1.

As shown in FIG. 4, the planar acoustic cavity 12 is bounded by first and second boundaries 58, 60 that define a fundamental acoustic mode of the planar acoustic cavity 12. In particular, the two boundaries 58, 60 correspond to end nodes of standing acoustic waves that the acoustic transducers generate in the planar acoustic cavity 12. The fundamental acoustic mode corresponds to a fundamental acoustic wavelength ($\lambda_F$) that is twice the acoustic distance between the two boundaries 58, 60. As used herein, the term "nodes" refers to local vibrational minima in the planar acoustic cavity 12 and the term "antinodes" refers to local vibrational maxima in the planar acoustic cavity 12.

Each of the acoustic waves 52 that is generated by the acoustic transducers 22 is a cylindrical wave. Some of the outgoing waves 52 propagate in a substantially uniform propagation direction 68 from the current acoustic transducer 22, across the liquid-filled channels defined by the cores 28, and to the boundary 58 of the planar acoustic cavity 12. These outgoing acoustic waves 52 reflect off the boundary 58 to form incoming acoustic waves that propagate in the opposite direction as their counterpart outgoing acoustic waves. Other ones of the outgoing waves that are generated by the acoustic transducers 22 propagate toward the second boundary 60. These outgoing acoustic waves reflect off the boundary 60 to form incoming acoustic waves that propagate in the opposite direction as their counterpart outgoing acoustic waves.

When the acoustic frequency corresponds to a resonant mode (e.g., the fundamental acoustic mode or a harmonic of the fundamental acoustic mode) of the planar acoustic cavity 12, the outgoing and incoming acoustic waves interfere constructively. The fundamental acoustic mode is characterized by respective nodes 62, 64 at the boundaries 58, 60 and a single antinode 66 that is located between the two boundaries 58, 60. In some implementations, the planar acoustic cavity 12 is designed so that the antinode 66 (i.e., the location of maximum vibrational intensity) coincides with the centers of the cores 28 of the optical waveguides 18 so that the maximum amount of energy is transferred to the liquid in the cores 28.

The planar acoustic cavity 12 defines the acoustic space in which the acoustic waves propagate. Therefore, the process of forming the acoustic waves effectively is decoupled from the physical dimensions of the optical waveguide cores 28. Since the acoustic distance between the boundaries 58, 60 can be controlled independently of the cross-sectional dimensions of the optical cores 28, the wavelength of the resonant acoustic mode can be much larger than the cross-sectional dimensions of the optical waveguide cores 28. This allows the acoustic frequency to be reduced to accommodate practical power and heating constraints. For example, in some implementations, the fundamental acoustic wavelength is four times larger than the cross-sectional dimensions of the optical waveguide cores 28. In this way, the fundamental acoustic mode can correspond to a relatively low acoustic frequency (e.g., 100–200 kHz), while the pixel size determined by the size of the optical waveguide cores 28 can be sized for proper display of images on the display system 10 (e.g., 1 mm×1 mm).

Cavitation is induced when the power density of the acoustic wave 52 is sufficiently high. As the acoustic wave 52 propagates through the liquid-filled cores 28, the liquid is alternately compressed and rarified. If the pressure in the rarifaction cycle is sufficiently low, bubbles form in the liquid. These bubbles rapidly collapse during the compression cycle. The cavitation bubbles form and collapse in periods that are on the order of microseconds. At an acoustic frequency of 40 kHz, the cavitation threshold is 0.3–0.5 Watts/cm$^2$ for water, in which case 3–5 Watts are needed to induce cavitation in a 1 mm wide by 1080 mm long optical waveguide core 28.

The cavitation bubble size depends on the acoustic frequency. The bubble size is inversely proportional ultrasonic frequency, whereas the bubble density is proportional to ultrasonic frequency. At low acoustic frequencies (20–30 kHz), a small number of bubbles of large size are generated (50–150 μm). At 5 MHz, the bubble size is roughly 0.5 μm. At these higher frequencies, however, the cavitation bubbles tend to persist throughout the acoustic cycle because they do not have time to collapse during the compression phase.

Figure 5:
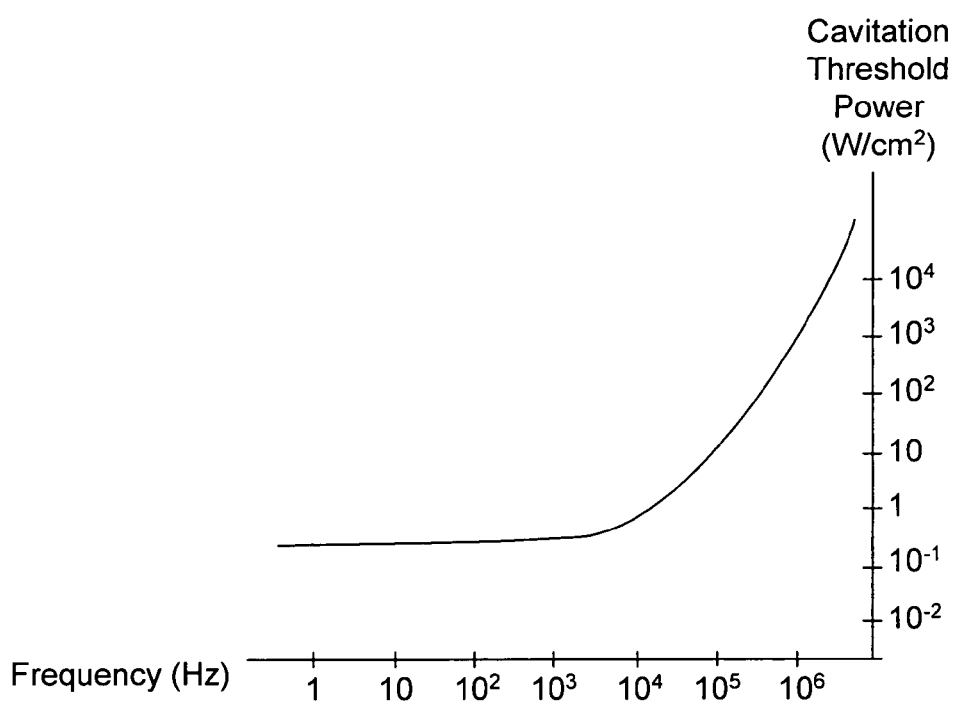
FIG. 5 is a graph of the acoustic power cavitation threshold plotted as a function of acoustic frequency.

In addition, a disadvantage of moving into the megahertz frequency range is the increased acoustic power that is required to reach the cavitation threshold. As shown in FIG. 5, the acoustic power cavitation threshold for water increases exponentially with acoustic frequency. When the acoustic frequency is in the megahertz range, the cavitation threshold is on the order of $10^3$ Watts/cm$^2$, which may be prohibitive for many practical implementations of the display system 10.

The cavitation bubbles create refractive index inhomogeneities that scatter light out of the waveguide cores 28. In the illustrated embodiments, the acoustic waves that are generated by an active one of the acoustic transducers 22 turn on an entire column of pixels at the same time. The acoustic transducers 22 are sequentially strobed in rapid succession while the light sources 40 are driven with the appropriate currents to create an entire video frame. In some implementations, the optical waveguide array 16 includes 1080 optical waveguide cores 28 that are 1 mm wide by 1920 mm in length to provide a display area with a diagonal length of 2.2 meters. The acoustic transducers 22 across the display system 10 are sequentially strobed in a cycle time of less than 1/60$^{th}$ of a second to minimize flicker. In some implementations, the light sources 40 may be placed at both ends of each of the optical waveguides 18 and two column acoustic transducers 22 may be excited simultaneously to double the brightness and double the refresh rate of the display system 10.

Figure 6:
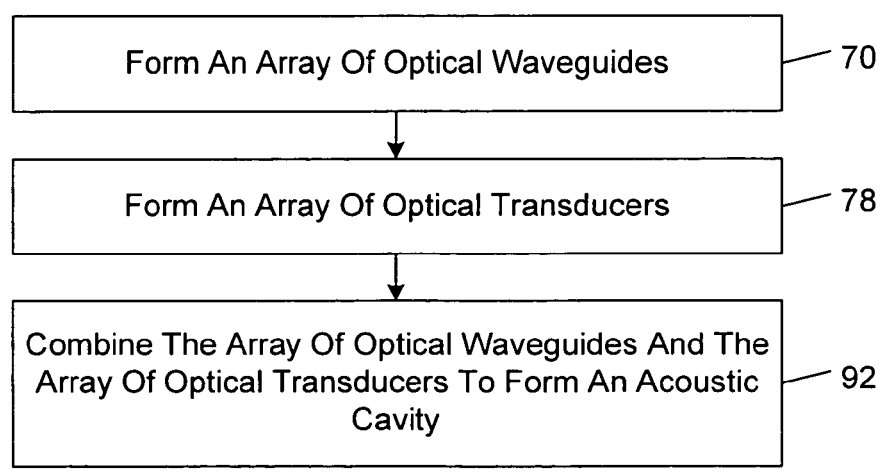
FIG. 6 is a flow diagram of an embodiment of a method of fabricating the optical waveguide display system shown in FIG. 1.

FIG. 6 shows an embodiment of a method of fabricating the display system 10. In accordance with this method, the array 16 of optical waveguides 18 is formed (block 70). In general, the array 16 of optical waveguides 18 may be formed of any optical structure that includes for each optical waveguide 18 a respective cladding 26 surrounding a respective core 28 that defines a respective liquid-filled channel.

After the array 16 of optical waveguides 18 is formed (block 70), the array 20 of acoustic transducers 22 is formed (block 78). The array 20 of acoustic transducers 22 may be formed of any type of structure that is capable of generating acoustic waves. In the embodiment shown in FIG. 1, the array 20 of acoustic transducers 22 is formed of a planar sheet 30 of piezoelectric material that includes a ground plane electrode 32 on one surface and an array of signal electrodes 34 on an opposite surface.

After the array 20 of acoustic transducers 22 is formed (block 78), the array 16 of optical waveguides 18 and the array 20 of acoustic transducers 22 are combined to form the planar acoustic cavity 12 (block 92). In this process, the optical waveguide array 16, the acoustic transducer array 20, and the substrate 24 are laminated together to form the planar acoustic cavity 12. The individual is components of the planar acoustic cavity 12 may be laminated together using, for example, a compatible epoxy adhesive.

The light source system 14 then may be coupled to the planar acoustic cavity 12. In this process, the planar acoustic cavity 12 and the light source system 14 typically are mounted in registered alignment in a display housing that also contains the transducer drive circuitry 36, the optical drive circuitry 42, and other components of the display system 10.

Figure 7A:
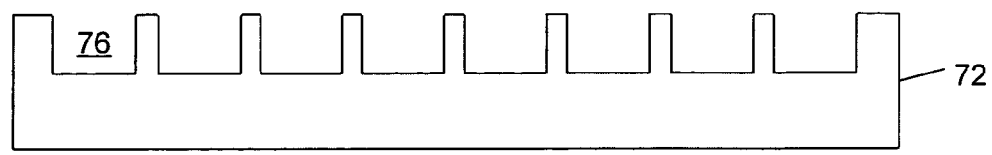
FIGS. 7A and 7B are respectively side and top views of an embodiment of an optical substrate defining channels corresponding to the cores of optical waveguides.
Figure 7B:
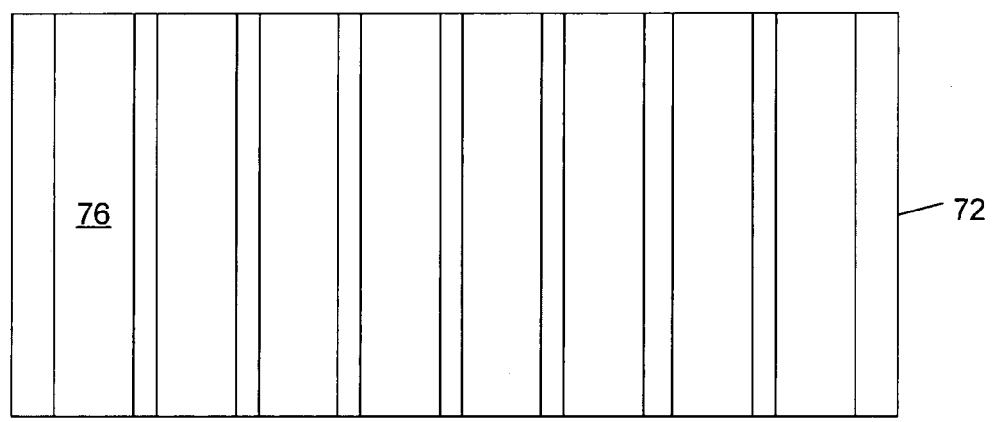
Figure 7C:
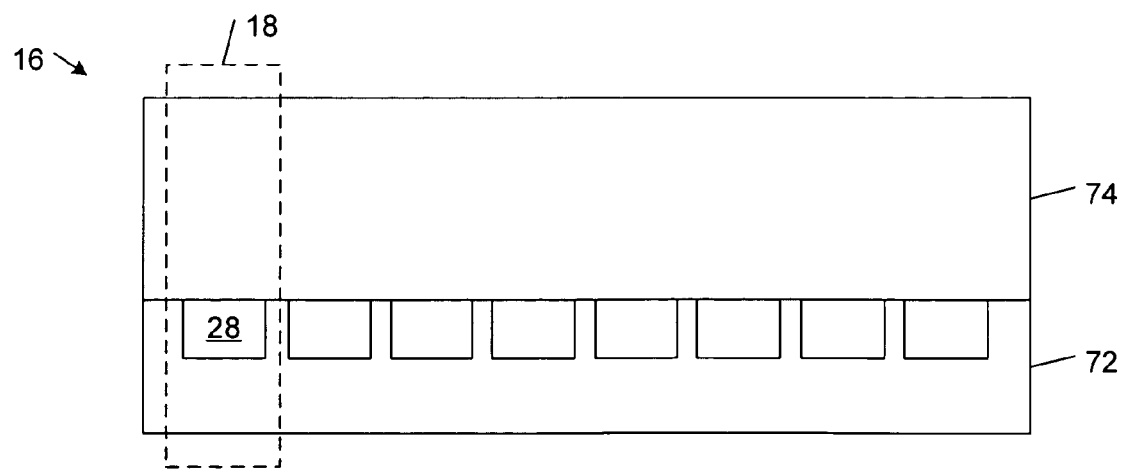
FIG. 7C shows an embodiment of an optical waveguide structure that is formed from the optical substrate shown in FIGS. 7A and 7B.

Referring to FIGS. 7A–7C, in one embodiment, the array 16 of optical waveguides 18 is formed from a first optical substrate 72 and a second optical substrate 74. The optical substrates 72, 74 are formed of material corresponding to the cladding of the optical waveguides 18. In some implementations, the optical substrates 72, 74 are formed of TEFLON®. The first optical substrate 72 includes an array of grooves 76 that define liquid-filled channels corresponding to the cores 28 of the optical waveguides 18. The grooves 76 may be formed in any one of a wide variety of different ways, including by knurling, embossing, molding, and etching processes. The first and second optical substrates 72, 74 are bonded together as shown in FIG. 7C to form fluid-tight seals over the grooves 76. The resulting cores 28 of the optical waveguides 18 may have rectangular cross-sections as shown in FIG. 7C, or they may have non-rectangular cross-sections (e.g., circular or elliptical cross-sections). In some other implementations, the first and second optical substrates 72, 74 may include respective grooves that are aligned to form the optical waveguide cores 28. In still other implementations, the array 16 of optical waveguides 18 is formed from a monolithic optical substrate. An array of holes that correspond to the cores 28 are formed in the monolithic optical substrate. The holes may be formed by drilling, etching, or molding processes.

Figure 8:
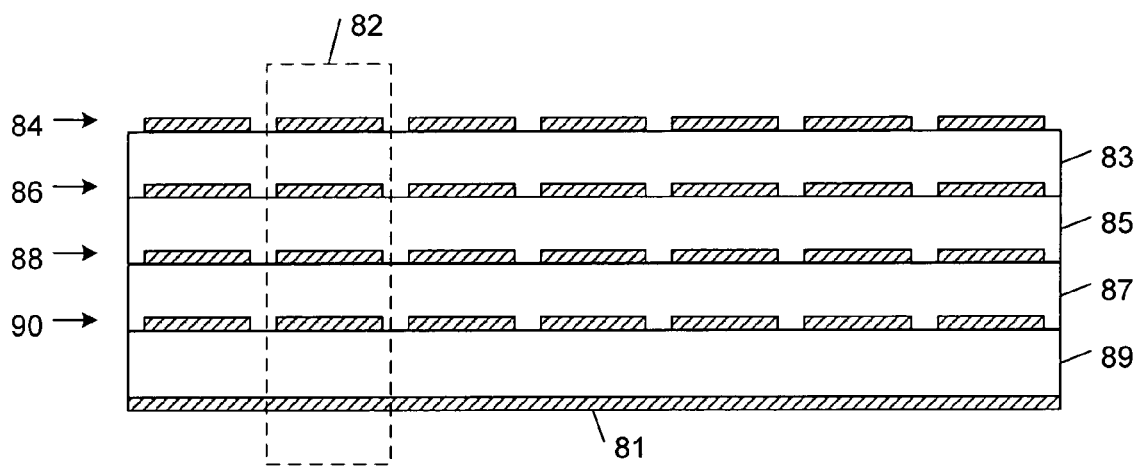
FIG. 8 is a diagrammatic side view of an embodiment of an array of acoustic transducers that includes a stacked arrangement of multiple planar arrays of acoustic transducers.

FIG. 8 shows an alternative array 80 of optical transducers 82. This implementation includes a stacked arrangement of multiple planar arrays of acoustic transducers. The stacked arrangement includes multiple layers 83, 85, 87, 89 of piezoelectric material (e.g., PZT), a ground plane electrode 81, and multiple arrays of elongated signal electrodes 84, 86, 88, 90. The piezoelectric layers 83, 85, 87, 89 are arranged with their respective polarization axes oriented so that the acoustic power they generate adds in series. This allows the signal electrodes 84, 86, 88, 90 to be driven with a lower drive voltage than comparable implementations that have fewer piezoelectric layers to achieve the same acoustic power. In operation, the transducer drive circuitry 36 drives the signal electrodes 84, 86, 88, 90 corresponding to the same acoustic transducer 82 in parallel.

Other embodiments are within the scope of the claims.

What is claimed is:

1. A display system, comprising:
   a planar acoustic cavity having a fundamental resonant acoustic mode, the acoustic cavity comprising
   an array of optical waveguides each comprising a respective cladding surrounding a liquid-filled core, and
   an array of acoustic transducers operable to generate acoustic waves propagating in the acoustic cavity across the cores of the optical waveguides.

2. The display system of claim 1, wherein the array of optical waveguides comprises a shared optical substrate forming the cladding of the optical waveguides and defining channels corresponding to the cores of the optical waveguides.

3. The display system of claim 1, wherein the array of acoustic transducers comprises a piezoelectric substrate supporting a ground plane electrode on one side and an array of electrodes on an opposite side.

4. The display system of claim 1, wherein the array of optical waveguides and the array of acoustic transducers lie in different respective parallel planes.

5. The display system of claim 1, wherein each of the acoustic transducers generates cylindrical acoustic waves that propagate in substantially parallel propagation directions.

6. The display system of claim 5, wherein the cylindrical acoustic waves intersect the optical waveguides orthogonally.

7. The display system of claim 1, wherein the cores of the optical waveguides are located at an antinode of the fundamental resonant acoustic mode.

8. The display system of claim 1, wherein the cores of the optical waveguides are filled with a liquid having a higher refractive index than the surrounding cladding.

9. The display system of claim 1, wherein the fundamental resonant acoustic mode has a fundamental acoustic wavelength and the optical waveguide cores have cross-sectional dimensions smaller than one-quarter of the fundamental acoustic wavelength.

10. The display system of claim 1, wherein the planar acoustic cavity comprises a substrate supporting a stacked arrangement of the array of optical waveguides and the array of acoustic transducers.

11. The display system of claim 10, wherein the substrate is metallic.

12. The display system of claim 1, wherein the planar acoustic cavity comprises a second array of acoustic transducers configured to cooperatively generate the acoustic waves with the first array of acoustic transducers.

13. The display system of claim 1, further comprising a light source system operable to inject light into the optical waveguides.

14. The display system of claim 13, wherein the light source system is configured to inject multicolored light into each of the optical waveguides.

15. The display system of claim 14, wherein the light source system is operable to inject red, green, and blue light into each of the optical waveguides.

16. The display system of claim 1, wherein the planar acoustic cavity is bounded by first and second planar boundaries that define the fundamental acoustic mode, and each of the acoustic transducers generates acoustic waves that propagate from one of the first and second boundaries, transversely across the cores of the optical waveguides, and to the other one of the first and second boundaries.

17. A display method, comprising:
   optically guiding light through an array of liquid-filled optical waveguides; and
   generating acoustic waves propagating across the liquid-filled optical waveguides in substantially uniform propagation directions and inducing localized cavitation in the liquid.

18. The method of claim 17, wherein the generated acoustic waves are cylindrical acoustic waves that propagate in substantially parallel propagation directions.

19. The method of claim 18, wherein the cylindrical acoustic waves intersect the liquid-filled optical waveguides orthogonally.

20. The method of claim 17, wherein the generating comprises generating the acoustic waves with antinodes at the liquid-filled optical waveguides.

21. The method of claim 17, wherein the generating comprises generating the acoustic waves with a characteristic wavelength larger than four times the cross-sectional dimensions of the liquid-filled optical waveguides.

22. The method of claim 17, wherein the optically guiding comprises optically guiding multicolored light through each of the liquid-filled optical waveguides.

23. A method of fabricating a display system, comprising:
   forming an array of optical waveguides each comprising a respective cladding surrounding a liquid-filled core;
   forming an array of acoustic transducers operable to generate acoustic waves propagating in a planar acoustic cavity across the cores of the optical waveguides; and
   combining the array of optical waveguides and the array of acoustic transducers to form the planar acoustic cavity having a fundamental resonant acoustic mode.

24. The method of claim 23, wherein the forming of the array of optical waveguides comprises providing a shared optical substrate corresponding to the cladding of the optical waveguides, defining in the optical substrate an array of channels corresponding to the cores of the optical waveguides, and filling the array of channels with a liquid.

25. The method of claim 23, further comprising coupling to the planar acoustic cavity a light source system operable to inject light into the optical waveguides.

* * * * *